Dec. 8, 1964 R. A. GREGORY 3,160,854
LATTICE-TYPE CHARACTER RECOGNITION SYSTEM
Filed Jan. 12, 1961 2 Sheets-Sheet 1

*INVENTOR.*
RALPH A. GREGORY
*BY*
Sughrue, Rothwell, Mion & Zinn
*ATTORNEYS*

3,160,854

LATTICE-TYPE CHARACTER RECOGNITION SYSTEM

Ralph A. Gregory, Endwell, N.Y., assignor to International Business Machines Corporation, New York, N.Y., a corporation of New York Filed Jan. 12, 1961, Ser. No. 82,307
10 Claims. (Cl. 340—146.3)

This invention relates to a character recognition system and more particularly to one in which a coded output from a photosensitive element uniquely identifies each character.

Bank checking machines are a species of data processing apparatus which process commercial documents such as checks. A vital part of such machines is the character recognition associated therewith. The checks are imprinted with a unique combination of identifying characters on a marginal portion thereof and these characters are read by the character recognition system. In order to introduce a significant degree of standardization into this field, the American Banking Association has adopted a type font identified as E13B. This font was designed with two main objects in mind; (1) it should present the characters in readable form and (2) the shape of the characters should be such that a character recognition system can easily distinguish between said characters. The font provides 8 characters per inch. Each character has a minimum line width in the horizontal direction and in the vertical direction of .013 inch. The characters can effectively be divided into a plurality of these .013 inch by .013 inch squares. All characters, including the special characters, are between 4 and 7 squares in width and 9 squares in height. With a maximum document speed of 55 inches per second this means that 440 characters per second or 275 6-inch documents per minute can be sensed. The characters are sensed from left to right as the document proceeds through the machines.

The present invention, while in no event being limited to the E13B font, finds particular utility therewith. This font will be employed herein by way of illustration of the operation of the present invention. The character recognition apparatus of this invention is adapted to view each character as a whole as distinguished from a sequential sector-by-sector scan thereof and to provide coded outputs from a recognition element. These outputs are decoded to identify the character. From a system viewpoint, a source of light illuminates the character. The shadow image thereof is magnified by a factor of 10 and projected onto said recognition element. This element is composed of a plurality of spaced parallel photosensitive strips whose current conduction level (hereinafter referred to as current level) is a function of the number of shadow squares superimposed by the shadow image on said strips. Upon proper registration of the character on the recognition element, the current levels of each strip function as coded outputs. These outputs are decoded to identify the character.

Broadly speaking the instant invention relates to a character recognition system in which the character is projected onto a photosensitive lattice, said lattice being constructed of a plurality of photosensitive strips, each having a selected parameter whose value is a function of the image of the character when superimposed on said lattice, the decoding of the individual parameter values of each strip identifying said character.

It is therefore an object of the present invention to provide a character recognition system which views the character as a whole as distinct from a sequential sector-by-sector scanning thereof.

It is a further object to provide such a system in which coded outputs are simultaneously available for decoding as identification of the character.

It is another object of the present invention to provide such a system which finds particular utility in the recognition of ABA type E13B font characters.

A further object of the invention is to provide such a system in which a lattice composed of photosensitive strips is the basic recognition element of said system.

The foregoing and other objects, features and advantages of the invention will be apparent from the foregoing more particular description of a preferred embodiment of the invention as illustrated in the accompanying drawings.

Figures 1, 2:
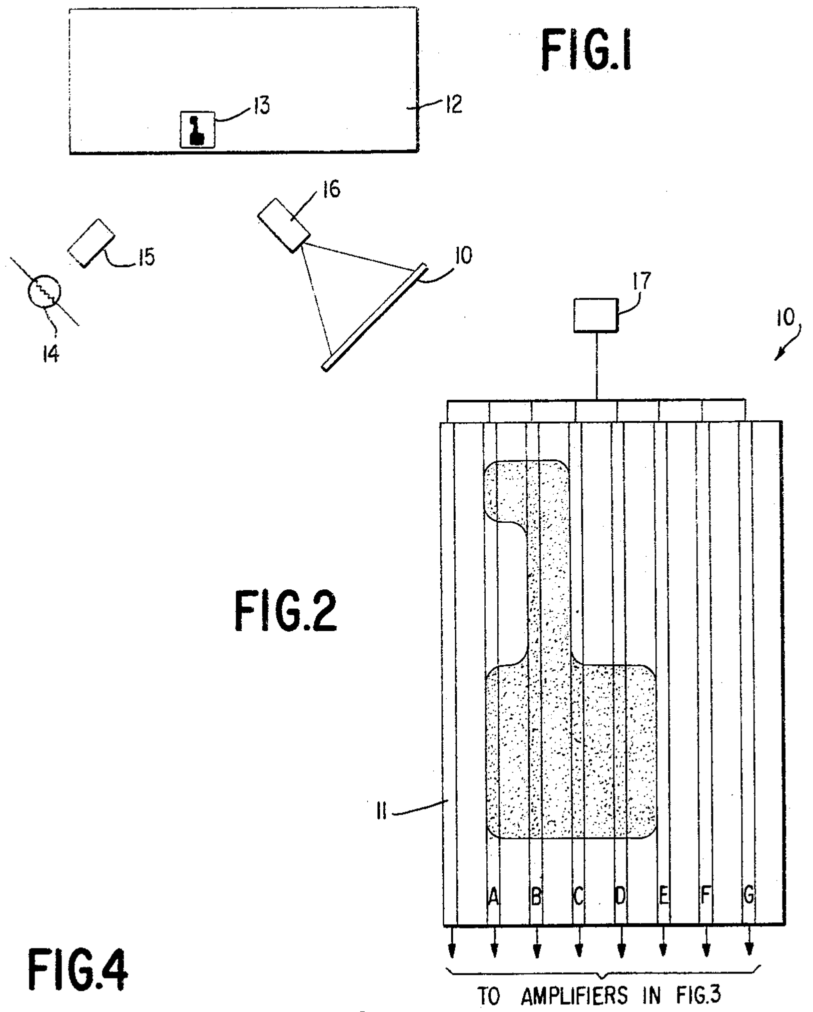
FIGURE 1 is a diagrmmatic representation of one form of system which may be employed in accordance with the present invention.
FIGURE 2 is a plan view of one form of lattice recogintion element which may be employed in accordance with the present invention.

Turning first to FIGURE 1, the lattice 10 is composed of a plurality of spaced, parallel, photosensitive strips and has projected thereon with, for example, a magnification of 10, the shadow image of the E13B font character numeral 1. The strips are preferably photo-voltaic in which light impingement thereon generates current therethrough. Photo-resistive strips may also be used with an appropriate source of constant current. The character is shown in a viewing station defined by the mask 13, it being assumed that the check or document 12 is moving from left to right as viewed herein and that there are a series of these characters (not shown) serially aligned on the marginal portion of said check. Means such as the light source 14 and the lens system 15 illuminate the light absorbing character imprinted on the reflective material of the check. The shadow image is magnified by the lens system 16.

In FIGURE 2, there is shown, in enlargement, the lattice 10 with the shadow image of the character 1 outlined thereon, properly registered with said lattice. The lattice is here composed of seven spaced, parallel photosensitive strips A through G, each separately insulated from neighboring strips. If it is assumed that the document speed is 55 inches per second, then the shadow image speed, due to the magnification of 10, is 550 inches per second. The width of the strip should be the smallest possible fraction of the shadow image line width of .13 inch, taking into consideration the magnification by the factor of 10 of the character original line width of .013 inch. A suitable width of strip is .02 inch. The height of the lattice should be at least nine of the squares originally referred to, magnified by the factor 10, that is, at least 1.17 inches and preferably around 2 inches to accommodate an acceptable degree of vertical misalignment of the characters with respect to the lattice. Broadly speaking, the length of the strips depends on the magnification factor, the tolerable degree of vertical misalignment, the space avaiable and the sensitivity of each strip in relation to the resistivity created by the minimum shadow possible for any character. Any suitable type of photosensitive material may be used for the strips. One specific type is silicon semi-conductor. Photovoltaic and photo-resistive materials commonly employed in the art may be used.

For illustration purposes let it be assumed that the rise time of these strips is .2 millisecond, that is, the time necessary for the resistance change of the strips. This, considered with the image speed of 550 inches per second means that the insulation between the strips is about .110 inch.

The registration detection photo-voltaic strip 11 is used to insure proper horizontal registration of the character shadow image with the lattice. Bearing in mind that the image flows from left to right across the lattice, the current in strip 11 begins to decrease when said image first impinges on this timing strip. This decrease is detected, as will be shown in connection with FIGURE 3, and the start of the recognition cycle is noted. No recognition is achieved however, until this decrease is followed by a complete return of the original current. This occurs when the image has passed the recognition detection strip and this strip is again completely illuminated. A further condition of recognition will be discussed at a later point to accommodate the special characters.

Numeral 17 indicates ground when using photo-voltaic strips and a constant current source when using photo-resistive strips. Full illumination of strip 11 will provide a level 1 current and all other amplitudes of current flow therethrough are identified as level 2. Means are provided in association with strip 11 to prevent an indication of registration until level 1 is followed by level 2, thus preventing recognition when no image is present or when an image is present but not yet fully registered horizontally with respect to the lattice.

Recalling the .13 inch by .13 inch squares previously referred to, when the character 1 is properly registered, strip A has 5 squares shadowed, strip B has 9, strip C has 4, strip D has 4 and strips E through G have none. If we view the conditions present for all such characters from zero to nine, we find the following conditions existing:

| | Level 1 | Level 2 | Level 3 |
|---|---|---|---|
| Strip A | | 3–7 | 9 |
| Strip B | 0–1 | 2–7 | 9 |
| Strip C | 0–1 | 2–4 | 6–9 |
| Strip D | 0–1 | 2–6 | 9 |
| Strip E | 0 | 2 or more | |
| Strip F | 0 | 2–6 | 9 |
| Strip G | 0 | 4 or more | |

Analyzing the above it is seen that strip A will be called upon to distinguish between those characters having from 3 to 7 squares of shadow and those having 9 squares. No character will have 8 squares on any of the 7 strips. Strip B must distinguish between characters having 0 to 1 square, 2 to 7 squares and 9 squares. Only the character 7 has one shadow square on strip B. If noise should make this look like two squares and cause this to be seen as level 2, the recognition logic of FIGURE 3 will cause no failure or substitution. The same is true of strips C and D for the character 4. Therefore the following logic can be developed.

| Character: | Logic |
|---|---|
| 0 | $\bar{C}$ $\bar{D}$ $\bar{E}$ $\bar{F}$ $\bar{G}$ |
| 1 | $\bar{\bar{B}}$ E |
| 2 | $\bar{B}$ $\bar{C}$ $\bar{D}$ E |
| 3 | $\bar{\bar{D}}$ $\bar{E}$ $\bar{F}$ |
| 4 | $\bar{A}$ $\bar{E}$ $\bar{F}$ G |
| 5 | $\bar{C}$ $\bar{D}$ $\bar{E}$ F |
| 6 | $\bar{\bar{A}}$ $\bar{E}$ $\bar{F}$ G |
| 7 | $\bar{\bar{C}}$ $\bar{E}$ F |
| 8 | $\bar{\bar{B}}$ $\bar{E}$ $\bar{\bar{F}}$ $\bar{G}$ |
| 9 | $\bar{E}$ $\bar{\bar{F}}$ G |
|  | C $\bar{E}$ F $\bar{G}$ |
|  | B $\bar{C}$ D |
|  | $\bar{B}$ C E $\bar{F}$ |
| 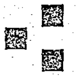 | $\bar{B}$ C D $\bar{E}$ $\bar{F}$ $\bar{G}$ |

No bar means level 1, one bar level 2 and two bars level 3.

The last four characters are the special characters previously referred to. They inject a further consideration for proper registration so that recognition is not attempted after only one of the segments making up the special character has passed the timing strip. Accordingly, additional logic is used as follows:

No recognition—

| | |
|---|---|
| Case 1 | B C |
| Case 2 | $\bar{B}$ C $\bar{D}$ E F |
| Case 3 | $\bar{B}$ $\bar{C}$ D E |

Therefore, recognition time is determined by the first indication of a shadow on the timing strip followed by complete exposure of the timing strip and the non-existence of any of the above cases of no recognition.

Figure 3:
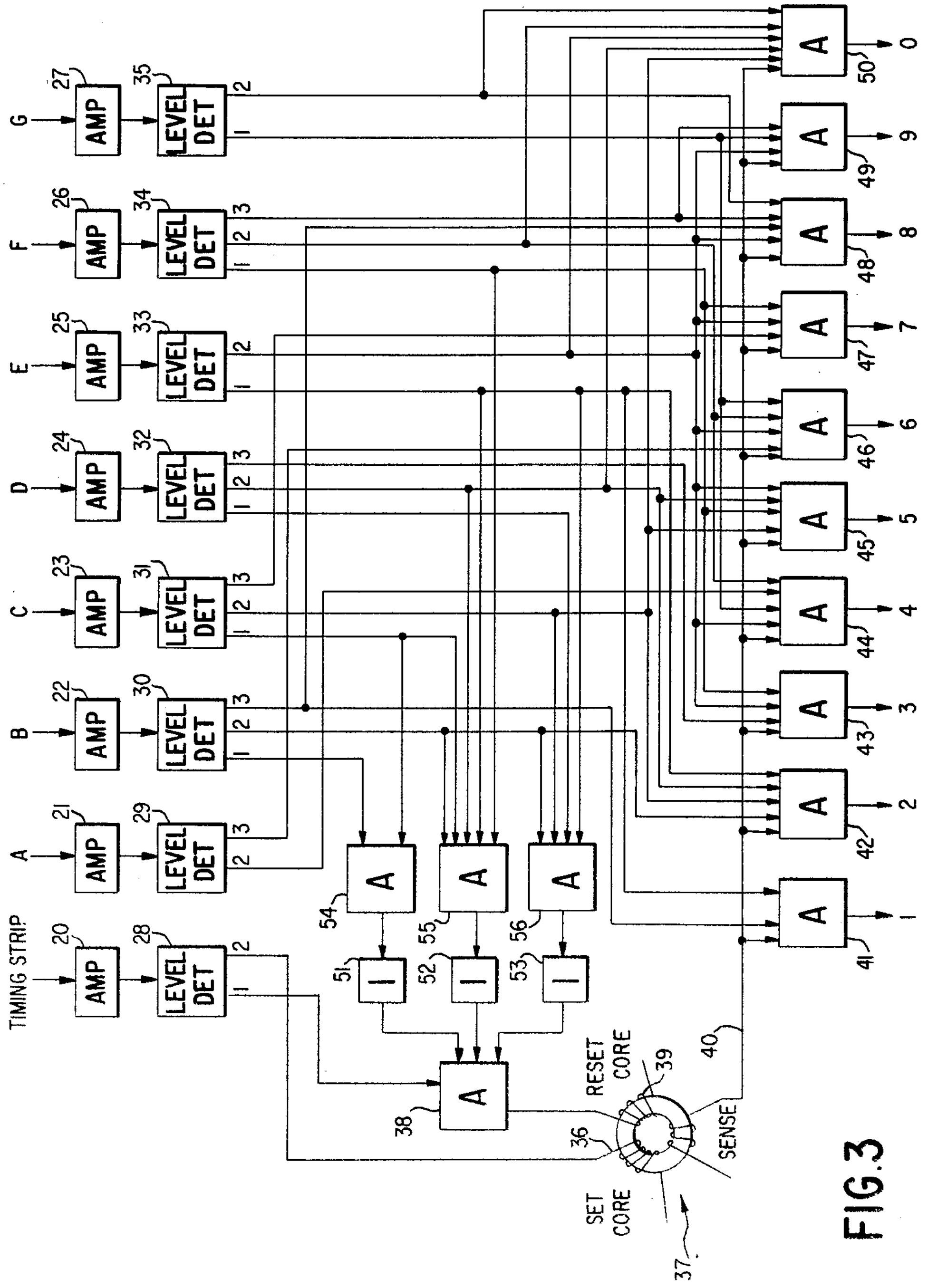
FIGURE 3 is a diagrammatic representation of one form of decoding means which may be used to decode the outputs provided by the elements of FIGURE 2 in order to identify the characters.

A system to implement this logic is shown in FIGURE 3. The inputs to current amplifiers 20 through 27 are connected to respective strips from FIGURE 2 as shown. The outputs of these amplifiers are fed to current level detectors 28 through 35. Each detector has either two or three outputs identified respectively as 1, 2 and 3 indicating level 1, level 2 and level 3 outputs. Detector 28 furnishes the level 1 and level 2 outputs for the timing strip 11. Bearing in mind that the timing strip is initially at level 1 due to complete exposure to light, the first impingement of the character onto the timing strip will provide a level 2 output. This output is fed to winding 36 on core 37 to set the core. This is a magnetic core having a substantially square loop hysteresis characteristic. When the character has completely passed over the timing strip and level 1 is again restored, the level detector 28 will provide again the level 1 output to the AND gate 38. Provided the three cases of no recognition do not prevail, this AND gate will thereby be unblocked to provide a signal to the reset coil 39 to reset the core 37. This provides an output on the sense line 40 to condition each of the AND gates 41 through 50. The recognition cycle is commenced on the setting of core 37 and recognition occurs on the resetting thereof. If none of the three cases of no recognition are present, the outputs of inverters 51, 52 and 53 are up, meaning that AND gates 54, 55 and 56 are not unblocked. AND gate 54 is sensitive to no recognition case 1, AND gate 55 to no recognition case 2 and AND gate 56 to no recognition case 3. If any of these cases are present, AND gate 38 is blocked, the core 37 is not reset and recognition does not occur.

Assuming however, that recognition does occur due to the sense output on sense line 40, it can be seen, for instance, that AND gate 41 provides identification of the character 1 because at its inputs thereto are fed level 3 from strip B and level 1 from strip E. Referring for a moment to FIGURE 2, it can be seen that the character 1 has nine shadow squares over-lying strip B and zero shadow squares over-lying strip E. The level table previously outlined indicates that for strip B 9 squares will provide a level 3 output and for strip E 0 square will provide a level 1 output. This coincides with the logic just explained with reference to FIGURE 3. All other AND gates 42 through 50 are blocked. Therefore, the output from AND gate 41 goes up indicating that the character in registration with the lattice 10 is a 1. If, for instance, strip D provided a level 3 output, strip E a level 2 output, and strip F a level 1 output, then AND gate 43 would be unblocked to provide an identification of a character 3 in registration with the lattice. Similar logic can be incorporated into this circuit of FIGURE 3 for the special characters observing the logic rules previously set forth.

As previously noted, the characters 4 and 7 might, due to noise, introduce a level 2 response rather than a level 1 response for strip B in connection with character 7 and strips C and D in connection with character 4. Therefore, as can be seen in connection with the logic of FIGURE 3, the recognition of the character 7 does not involve strip B and the recognition of the character 4 does not involve strips C and D.

It is contemplated in accordance with this invention that in some instances the document travel may be from right to left rather than from left to right as previously described. In this event, the timing strip is positioned on the right edge of the lattice recognition element of FIGURE 2 but the logic, of course, remains identical. Additionally, under some circumstances, it may be advisable to position a timing strip on both edges of the lattice of FIGURE 2. In this event the time of recognition is defined as when the output of both of these timing strips are equal. This condition of equality for recognition can only occur when a character is completely between the timing strips since all characters have a maximum of 7 squares in width and the two timing strips are positioned approximately 8 line widths or squares apart. For those cases where a part of a character has crossed the lead timing strip and the timing strips come to an equal output (special characters and certain threshold cases of the characters 4 and 7), a faulty recognition tends to occur but this faulty recognition has already been eliminated in the logic by the three cases of no recognition previously referred to. Also, when no character is between the timing strips, such as when the document is first entering the reading zone, the no recognition logic would prevent recognition.

It is considered that two timing strips are used, one on the right-hand edge of the lattice (not shown) and one on the left-hand edge of the lattice, that is timing strip 11, the first impingement of the shadow image moving from the right to the left would provide a level 2 output from the level detector associated with the right-hand edge timing strip to set core 37. After the character has been completely passed over this right-hand edge timing strip and level 1 is again achieved, the core will be reset by the level 1 output of the level detector associated with this right-hand edge timing strip, provided (1) level detector 28 of FIGURE 3 also provides a level 1 output and none of the three cases of no recognition is present.

Figure 4:
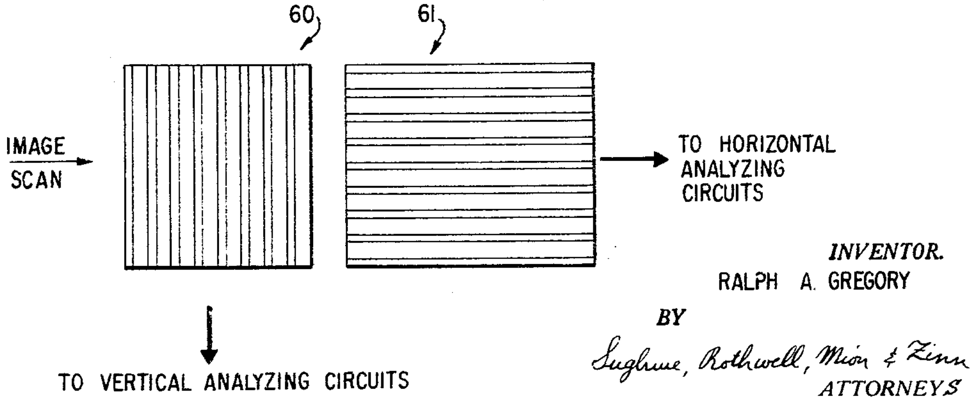
FIGURE 4 is a diagrammatic representation of two lattice recognition elements, one for analyzing the vertical components of the character being scanned and the other for analyzing the horizontal components of the character being scanned.

Referring to FIGURE 4, the lattice element 60 is similar to the lattice element 10 shown in FIGURE 2. It, as previously described, analyzes the vertical components of the character being scanned. The lattice element 61 is located 90° from the lattice element 60 to thereby analyze the horizontal components of said character. Other degrees of rotation may be employed but 90° is preferred. The outputs from both of these lattice elements feed analyzing circuits similar to that shown in FIGURE 3. By virtue of additionally analyzing the horizontal components of the character, further information relative to its identification can be obtained.

While the invention has been particularly shown and described with reference to a preferred embodiment thereof, it will be understood by those skilled in the art that the foregoing and other changes in form and details may be made therein without departing from the spirit and scope of the invention. It is the intention, therefore, to be limited only as indicated by the scope of the following claims.

What is claimed is:

1. Character recognition apparatus comprising a lattice of spaced parallel photosensitive strips upon which the image of a character is projected, means to generate a single output signal from each of said strips when said image is projected thereon, the value of each of said strip signals being related to the portion of said strip occupied by said image, and means to decode said signals to provide an indication of said character.

2. Apparatus as claimed in claim 1 further including means to indicate proper registration of said image with said lattice.

3. Character recognition apparatus comprising a lattice of spaced parallel photosensitive strips upon which the shadow image of a character is projected, means to indicate the proper registration of said image with said lattice, a multi-output current level detecting means associated with each of said strips conditioned by said last-mentioned means to detect the level of current flow through each of said strips and to provide an output signal on one of said current level outputs as a function of the value of current flowing through each of said strips and means to decode said one outputs to provide an indication of said character.

4. Apparatus as claimed in claim 3 wherein said current level detecting means comprises a current level detector associated with each of said strips, each of said detectors having at least two outputs providing a signal thereon responsive to a selected range of current levels flowing through its associated strip.

5. Character recognition apparatus for the recognition and identification of a character comprising a lattice of first spaced parallel photosensitive strips upon which an image of said character is projected in motion across said lattice from a position of original impingement on said lattice to a position of registration therewith, means to indicate said original impingement and subsequent position of registration, means to generate a single output signal from each of said strips when said image is projected thereon, means conditioned by said detection means to measure the value of said generated signals for each of said strips and to provide an output signal therefrom on a selected output thereof indicative of the value of said generated signal and means to decode said outputs to provide an indication of said character.

6. Apparatus as defined by claim 5 wherein said detection means includes a detection photosensitive strip spaced from and parallel to said first strips and positioned at said position of original impingement.

7. Apparatus as defined by claim 6 wherein said first spaced parallel photosensitive strips and said detection photosensitive strip is comprised of a photovoltaic material.

8. Apparatus as claimed by claim 6 wherein said detection means further includes a two-state device normally set to the first of said states, means responsive to said original impingement of said image onto said detection strip to switch said device to the second of said states and means responsive to the subsequent end of impingement of said image on said detection strip to restore said first state of said device thereby indicating said registration.

9. Apparatus as claimed in claim 6 wherein said first spaced parallel photosensitive strips and said detection photosensitive strip is comprised of a photoresistive material.

10. A character recognition apparatus as defined by claim 5 further including an additional lattice of spaced parallel photosensitive strips, said additional lattice being positioned adjacent said lattice of first spaced parallel photosensitive strips and in the path of motion of said character, said spaced parallel photosensitive strips of said additional lattice being arranged in a direction substantially normal to the direction of said first spaced parallel photosensitive strips.

References Cited in the file of this patent

UNITED STATES PATENTS 2,010,543 Gray ------------------- Aug. 6, 1935

2,682,043 Fitch ------------------- June 22, 1954